US008676692B2

(12) United States Patent
Davies

(10) Patent No.: US 8,676,692 B2
(45) Date of Patent: Mar. 18, 2014

(54) SYSTEM AND METHOD FOR AIR TRAVEL COMMODITIZATION

(76) Inventor: Scott R. Davies, Allentown, PA (US)

( * ) Notice: Subject to any disclaimer, the term of this patent is extended or adjusted under 35 U.S.C. 154(b) by 939 days.

(21) Appl. No.: 12/625,500

(22) Filed: Nov. 24, 2009

(65) Prior Publication Data

US 2010/0131402 A1   May 27, 2010

Related U.S. Application Data

(60) Provisional application No. 61/117,339, filed on Nov. 24, 2008.

(51) Int. Cl.
*G06Q 40/00* (2012.01)
(52) U.S. Cl.
USPC .......................... 705/37; 705/7.12; 705/7.29
(58) Field of Classification Search
USPC .......................................... 705/7.12, 7.29, 37
See application file for complete search history.

(56) References Cited

U.S. PATENT DOCUMENTS

| 2,183,915 | A  | * | 12/1939 | Killingstad ................... 426/482 |
| 6,134,500 | A  | * | 10/2000 | Tang et al. .................... 701/528 |
| 6,246,342 | B1 | * | 6/2001  | Vandevoorde et al. ....... 340/961 |
| 6,584,400 | B2 | * | 6/2003  | Beardsworth ................. 701/120 |
| 2003/0093187 | A1 | * | 5/2003 | Walker ............................ 701/1 |
| 2007/0106594 | A1 | * | 5/2007 | Vlahoplus et al. ............. 705/37 |
| 2008/0201183 | A1 | * | 8/2008 | Jha et al. ........................ 705/7 |
| 2010/0131402 | A1 | * | 5/2010 | Davies ........................... 705/37 |

OTHER PUBLICATIONS

Ball et al. Auctions for the Safe, Efficient and Equitable Allocation of Airspace System Resources. George Mason University. Fairfax, VA 22030.*
Hoffman et al. A comparison of Formulations for the Single-Airport Ground-Holding Problem with Bnaking Constraints. Operations Research. Jul./Aug. 2000; ABI/INFORM Global p. 578.*
Wald, Matthew L. U.S. Plans Steps to Ease Congestion at Airports. The New York Times. Published: May 17, 2008.*
Dorothy Robyn, Reforming the Air Traffic Control System to Promote Efficiency and Reduce Delays, Oct. 29, 2007.
Dorothy Robyn, Air Support: Creating a Safer and More Reliable Air Traffic Control System, Discussion Paper 2008-11, Jul. 2008.
Michael Ball, George L. Donohue, and Karla Hoffman, Auctions for the Safe, Efficient, and Equitable Allocation of Airspace System Resources.

* cited by examiner

*Primary Examiner* — Muriel Tinkler
(74) *Attorney, Agent, or Firm* — Design IP

(57) ABSTRACT

System and methods are provided for the definition and commoditization of a four-dimensional trajectory of airspace, i.e., a bundle of spatially-contiguous, three-dimensional volumetric units of airspace at distinct, finite, and contiguous periods of time. The three primary determinants of air transportation throughput, i.e., seat and freight capacity, runway environment capacity, and safe-separation airspace capacity, are individually defined and commoditized. In an illustrative implementation, parties may compete to offer units of safe-separation airspace capacity, which may be bundled together to form a four-dimensional trajectory, and/or runway environment capacity, which may collectively comprise a particular flight bundle. This flight bundle may then be sold on a commodities market to the highest-bidding seat and freight capacity provider. In a further illustrative implementation, a seat and freight capacity provider may purchase a flight bundle comprising a primary four-dimensional trajectory and one or more contingent four-dimensional trajectories or portions thereof.

20 Claims, 9 Drawing Sheets

SYSTEM AND METHOD FOR AIR TRAVEL COMMODITIZATION

CROSS-REFERENCE TO RELATED APPLICATION(S)

The present application claims the benefit under 35 U.S.C. §119(e) of the filing date of U.S. Provisional Application No. 61/117,339, filed on Nov. 24, 2008, the disclosure of which is incorporated herein by reference as if fully set forth.

BACKGROUND

The present invention relates to a system and method for commoditizing "four-dimensional" air travel trajectories.

Presently, the consumption of navigable U.S. airspace, and its associated aviation infrastructure, are each governed by constraints other than free-market principles. Of the three major determinants of air throughput capacity, namely runway environment capacity, safe-separation airspace capacity, and seat and freight capacity, currently only seat and freight capacity is subject to the market forces of supply and demand. At this time, the supply of both runway environment capacity and safe-separation airspace capacity are fully dictated by federal aviation regulations, and are not to any substantial degree affected by market forces. As a result, the provision and throughput of air transportation services in the United States is currently less than optimal.

The U.S. government is presently making attempts to increase the capacity of air transportation control services (i.e. safe-separation airspace capacity) via development of the "Next Generation Air Transportation System" (hereinafter "NextGen"), which is expected to increase air transportation control capacity by a factor of 2 to 3 times. NextGen seeks to fabricate "slack" in the provision of air transportation control services through the advanced application of real-time, satellite-based telemetric data, using net-centric communication procedures. In effect, NextGen seeks to develop greater autonomy for air transportation vehicles to navigate U.S. airspace, which will remain under the control of the Federal Aviation Administration. NextGen is not expected to be fully operational until approximately 2025. NextGen, while theoretically increasing the supply of safe-separation airspace capacity, does nothing to account for the variable of market demand for the commodity of safe-separation airspace.

Various types of "pseudo" market-based methods for mitigating air transportation delays caused by limitations in the availability of units of runway environment capacity have previously been described, for example "congestion pricing" and runway "slot-auctioning." However, none of the known methods have proposed full deregulation of all three of the major determinants of air transportation throughput capacity, and commoditization thereof.

From the foregoing, it is appreciated that a system and method is needed for optimally defining and commoditizing each of the air transportation throughput components.

SUMMARY

The herein described systems and methods provide a method for managing air transportation comprising defining a flight bundle comprising a first four-dimensional trajectory and then granting rights, via a first market based process, for an air transportation vehicle to consume that flight bundle.

The herein described systems and method also provide a computer-implemented method for selecting one or more parties to provide services for a flight bundle, the flight bundle comprising a first four-dimensional trajectory, the method comprising receiving data from one or more parties, the data comprising one or more bids for the provision of safe-separation airspace services for the flight bundle, accepting the lowest one or more bids for the provision of safe-separation airspace services for the flight bundle, and notifying the one or more parties that provided the lowest one or more bids for the provision of safe-separation airspace services for the flight bundle.

The herein described systems and methods also provide a system for the distribution of a right to provide safe-separation airspace services for a four-dimensional trajectory, the system comprising a computer-based software unit for receiving data from one or more parties, the data comprising one or more bids for the provision of the safe-separation airspace services for the four-dimensional trajectory; and an instruction set, the instruction set comprising at least one instruction to instruct the software unit to accept a lowest bid for provision of the safe-separation airspace services for the four-dimensional trajectory, and at least one instruction to instruct the software unit to notify the party that provided the lowest bid.

Other features of the herein described systems and methods are further described below.

BRIEF DESCRIPTION OF THE DRAWINGS

The systems and methods for commoditization of four-dimensional air travel trajectories are further described with reference to the accompanying drawings in which.

DETAILED DESCRIPTION

Figure 1:
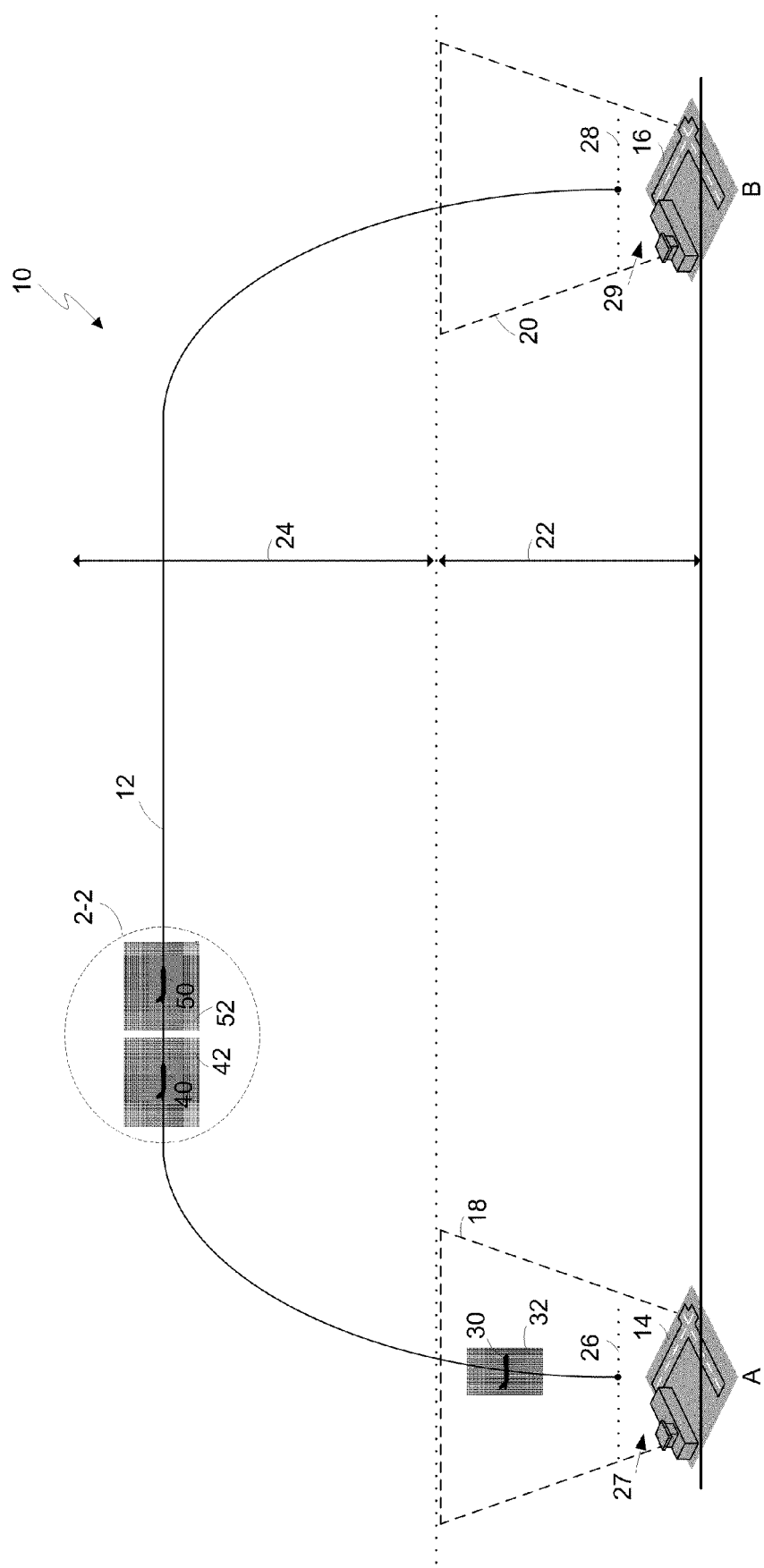
FIG. 1 is a diagram of an exemplary four-dimensional air travel trajectory between Airport A and Airport B.

The present invention is directed to systems and methods for accurately defining and commoditizing four-dimensional air travel trajectories. As used herein, "four-dimensional air travel trajectory" or "four-dimensional trajectory" should be understood to refer to a bundle of spatially-contiguous, three-dimensional volumetric units of airspace during distinct, finite, and contiguous periods of time. The three-dimensional volumetric units of airspace which comprise a four-dimensional trajectory may be spatially overlapping, and there may also be overlap in the temporal duration of units of four-dimensional airspace which define a four-dimensional trajectory. For purposes of this disclosure, the term "contiguous" permits overlap between air transportation units. The term "flight bundle," as used herein, refers to a package of one or more four-dimensional trajectories or components thereof which are purchased together, and may also include one or more units of runway environment capacity, as that term is defined below. It should be understood that a "flight bundle" may include one or more four-dimensional units of air transportation throughput capacity which is temporally or spatially non-contiguous with all other four-dimensional units of air transportation throughput capacity which are included as part of the flight bundle. A "complete flight bundle," as used herein, refers to a package of at least one four-dimensional trajectory and at least two units of corresponding runway environment capacity which seamlessly mate with respective ends of the four-dimensional trajectory.

The three primary determinants of air transportation throughput are seat and freight capacity ("SAF capacity"), runway environment capacity ("RE capacity"), and safe-separation airspace capacity ("SSA capacity"). Under the current U.S. air transportation system, only SAF capacity is subject to the market forces of supply and demand. RE capacity and SSA capacity, on the other hand, are currently fully controlled (i.e. rationed) by federal aviation regulations. The present invention recognizes the need for deregulation and commoditization of RE capacity and SSA capacity, and thereby proposes systems and methods for accomplishing the full deregulation, definition, and commoditization of four-dimensional air travel trajectories and the components thereof.

For the purposes of this application, the commoditization of four-dimensional air travel trajectories ("4DTs"), units of runway environment capacity, or the components thereof, comprises the use of one or more exemplary commodities markets, as will be described in greater detail below. The parties that interact with the commodities market may do so through the use of an exemplary computing system and/or computer network environment, as described in detail below.

The Three Primary Determinants of Air Travel Throughput

As stated above, the three primary determinants of air transportation throughput are SAF capacity, RE capacity, and SSA capacity. As used herein, the term "SAF capacity" refers to the quantity of passenger seats in and/or the weight or volumetric load capacity available on a particular air transportation vehicle. The term may also be used to refer, in the aggregate, to the sum of all available passenger seats and/or available weight or volumetric load capacities on or in all air transportation vehicles available for use over a particular period of time.

Currently, only SAF capacity is subject to the market forces of supply and demand. This was accomplished via the Airline Deregulation Act of 1978. Since that time, the provision and consumption of SAF capacity has largely been optimized through market forces. SAF capacity has, however, exceeded the available quantities of RE capacity and SSA capacity, which remain fully regulated by the federal government. As a result, the limited quantities of available RE capacity and SSA capacity, which have remained unresponsive to the free-market production of SAF capacity, continue to hinder the growth of U.S. economic productivity. By moving away from a regulated system for the provision of RE capacity and SSA capacity, the provision and consumption of these two air throughput determinants can be improved or fully optimized, thereby leading to an improvement in or complete optimization of the operation of the U.S. air travel industry.

It should be understood that SAF capacity providers are typically airlines or operators of airplanes or other flight vehicles, but may also be third parties acting on behalf of the airlines or flight vehicle operators. As discussed below, an SAF capacity provider may be the end-user of the SAF capacity, for example where a unit of SAF capacity is used for the shipment of freight, cargo, mail, or the like, or the SAF capacity provider may resell units of SAF capacity to third party end-users, for example passengers or other freight-, cargo-, or mail-shipping providers. SAF capacity providers may also enter into "code share" agreements with other SAF capacity providers, by which a part of their SAF capacity may be "released," in kind, to be marketed by the competitor SAF capacity provider.

RE capacity, as that term is used herein, refers to a complete and unitary system of elements required by federal regulations for facilitating the departures and arrivals of air transportation vehicles. For the purposes of this disclosure, in addition to a suitable runway surface, this term may encompass an array of air navigation and lighting systems for the guidance of air transportation vehicles approaching and departing a particular runway and traveling within the "airport traffic area," i.e. the portion of volumetric airspace which is controlled by the air-traffic control tower located near the respective runway. Current federal regulations define the typical "airport traffic area" as being located from ground level up to an altitude of 3,000 feet (914.4 m) above ground level, and within a 5 nautical mile (9,260 m) radius of the airport center point. For purposes of this disclosure, we will utilize this definition of "airport traffic area."

For purposes of this disclosure, a unit of RE capacity comprises the three-dimensional volumetric units of space occupied by an air transportation vehicle from the moment that vehicle crosses the "hold short" line of a runway surface through the moment that vehicle exits the respective airport traffic area during the period of time in which it takes the vehicle to travel through these three-dimensional volumetric units of space. In other words, a unit of RE capacity includes the fourth dimension of time. It should be understood that this definition of RE capacity is also applicable to an air transportation vehicle travelling through the airport traffic area and a runway surface in the reverse direction, i.e. an arriving air transportation vehicle. It should be understood that, in other contexts, "runway environment capacity" may omit one or more of the above components, or include additional (e.g., rolling-out or taxiing) or modified components (for example an airport traffic area of different dimensions), without deviating from the scope of this invention. It should also be understood that the duration of time considered as being a component of the term "runway environment capacity" could be defined in other fashions without deviating from the scope of this invention. For example, this duration of time could be measured beginning at the moment that an air transportation vehicle disconnects from a docking gate, or could be measured terminating at the moment an air transportation vehicle is no longer in contact with the runway surface.

An RE capacity provider may be, for example, an airport, a private entity, a municipality, a port authority agency, or a third-party acting on behalf of any of these entities. It should also be noted that the available supply of RE capacity at a particular location may be limited by "flight curfews," which may be but are not limited to airport noise abatement regulations during particular hours of the day. Additional local, state, and/or federal regulations may limit the ability of SAF capacity providers to utilize RE capacity during particular hours of the day at a particular airport, thereby limiting the overall availability of RE capacity at that location.

SSA capacity, as that term is used herein, refers to a complete and unitary system of elements required by federal regulations for facilitating the safe consumption of volumetric units of airspace capacity in order to avoid airborne collisions between air transportation vehicles. For the purposes of this disclosure, the term "SSA capacity" comprises a particular volumetric unit of airspace centered about a particular air transportation vehicle during a particular duration of time, in addition to the provision of air traffic control services during said duration of time which are requisite to both preventing other air transportation vehicles from infringing on said volumetric unit of airspace during said duration of time and ensuring that the safe separation airspace of other air transportation vehicles is not infringed upon.

Current federal regulations define the dimensions of a typical SSA unit. In general, from the ground level up to an altitude of 18,000 feet (5,486 m) above mean sea level ("MSL") (the "lower route structure"), the dimensions of a unit of SSA capacity define a cylinder with a diameter of 6 nautical miles (11.11 km) and a height of 2,000 feet (609.6 m), the cylinder being centered on the air transportation vehicle (i.e. the cylinder extends 1,000 feet (304.8 m) above and below the air transportation vehicle, and has a radius of 3 nautical miles (5.556 km) from the vehicle). As a result of the growth in high-speed commercial traffic over recent decades, the lower route structure generally accommodates low-density and most general aviation traffic. Between altitudes of 18,000 feet (5,486 m) MSL and 45,000 feet (13,716 m) MSL, (the "upper route structure"), the dimensions of a unit of SSA capacity define a cylinder with a diameter of 10 nautical miles (18.52 km) and a height of 2,000 feet (609.6 m), the cylinder being centered on the air transportation vehicle (i.e. the cylinder extends 1,000 feet (304.8 m) above and below the air transportation vehicle, and has a radius of 5 nautical miles (9.260 km) from the vehicle). As indicated above, the upper route structure generally accommodates the high-density and high-speed traffic of the commercial air carrier industry, as well as business-class jets. Currently, the upper route structure has an upper altitude limit that corresponds with the limitations of prevailing consumer air travel technology. It should be understood that this upper altitude limit is subject to change based on, for example, improvements in propulsion and airfoil technology.

For purposes of this disclosure, SSA capacity comprises the above components. It should be understood that, in other contexts, units of "safe-separation airspace" may omit one or more of the above components, or include additional or modified components (for example a unit of SSA capacity of different dimensions), without deviating from the scope of this invention. The implementation of NextGen, for example, is likely to make possible a reduction in the dimensions of a unit of SSA capacity. Additional emerging and as-yet undeveloped technologies may also make possible a reduction in the size of a unit of SSA capacity.

The matter of dividing and accounting for the entire expanse of volumetric airspace over the United States into units of SSA capacity is made possible by existing and emerging technologies, including but not limited to: Automatic Dependent Surveillance-Broadcast (Transmission) ("ADS-B (Out)"); Automatic Dependent Surveillance-Broadcast (Receiver) ("ADS-B (In)"); Global Positioning Systems ("GPS"); Wide Area Augmentation Systems ("WAAS"); On-board Flight Management Systems ("FMS"); Required Navigation Performance ("RNP"); Inertial Navigation Systems ("INS"); Reduced Vertical Separation Minimums ("RVSM"); Area Navigation ("RNAV"); Traffic Collision Avoidance Systems ("TCAS"); and Autonomous Traffic Collision Avoidance Systems ("ATCAS"). The applicability of the above and other technologies to the introduction and management of systems and methods according to the present invention will be appreciated by those having ordinary skill in the relevant art.

Moreover, the emergence and increasingly seamless interoperability of the above technologies will permit improved definition and management of 4DTs, which more reasonably permits these 4DTs, and the components thereof, to be commoditized. NextGen technologies are illustrative of the technological improvements that will make improved definition and management of 4DTs possible. It should be understood, however, that implementation of the present invention is not exclusively dependent on or made possible exclusively by the employment of NextGen technologies.

The existence of a "stovepipe" or "class-B structure" surrounding many airports, which accommodates the movement of air transportation vehicles from ground level runway environments into the upper route structure (and vice versa), should also be noted. Currently, the shape of a stovepipe approximates a plurality of stacked cylinders of increasing diameter as one moves from ground level to the uppermost altitude of the stovepipe structure (currently the lowest altitude of the upper route structure, i.e. 18,000 feet (5,486 m) MSL). This shape is also referred to, by those having ordinary skill in the art, as the "upside-down wedding cake." Existing and emerging technological improvements may permit the shape of a stovepipe to approach, approximately, an inverted, truncated cone centered about an airport, as illustrated by the two-dimensional view of stovepipes 18, 20 in FIG. 1. It should be understood that, within the typical stovepipe structure, i.e. at an altitude of approximately 3,000 feet (914.4 m) above ground level, there is a transition between the terminus of a unit of RE capacity and the beginning of an adjacent unit of SSA capacity, as the terms "RE capacity" and "SSA capacity" are defined above and used in the examples below.

Though we have described RE capacity providers and SSA capacity providers as distinct entities, it should be understood that, for a given flight bundle, a provider of RE capacity may be the same party as the provider of SSA capacity for some or all of that flight bundle.

Currently, the Federal Aviation Administration ("FAA") is responsible for providing substantially all SSA capacity services for the airspace over the United States. It is intended, when the systems and methods according to the present invention are instituted, that provision of units of RE capacity and units of SSA capacity would be removed from the FAA and other federal agencies and placed under the control of one or more public or private entities, which would be regulated by a public utility commission ("PUC") or one or more federal agencies. Government Agencies 82 (see FIG. 3), for example the FAA, Department of Transportation ("DOT"), or other agencies, may retain ultimate control over enactment and enforcement of air transportation safety regulations, and may place regulations directly on the market participants (as shown by the broken lines of FIG. 3).

Figure 2:
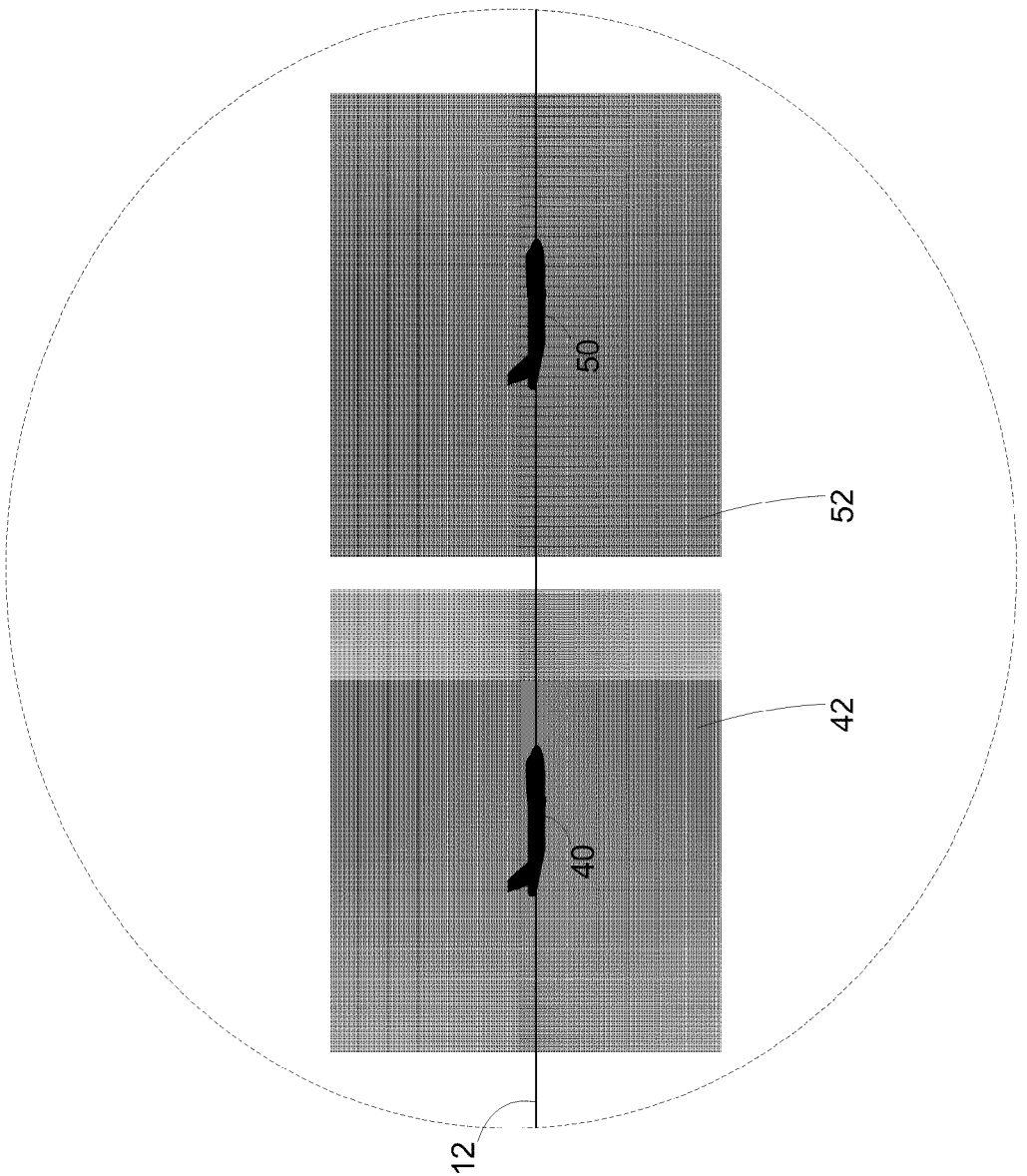
FIG. 2 is an enlarged partial view of area 2 of FIG. 1.

With reference to the attached Figures, FIG. 1 is a diagram of a typical flight bundle 10 in accordance with one embodiment of the present invention. The flight bundle 10 comprises an exemplary four-dimensional air travel trajectory 12 between a point in space on the edge 26 of the airport traffic area 27 of Airport A 14 and a point in space on the edge 28 of the airport traffic area 29 of Airport B 16. "Stovepipes" or class-"B" structures 18, 20, which approximate the shape of an inverted, truncated cone, surround Airport A 14 and Airport B 16, respectively, from the ground level up to the upper altitude of the lower route structure 22. During a first finite period of time, the air transportation vehicle 30 is located along the 4DT 12 within the stovepipe 18 and lower route structure 22. During this first period of time, the vehicle consumes a first unit of SSA capacity 32 having dimensions corresponding with the requirements for that altitude, as noted above. As best seen in FIG. 2, during a second period of time after the first period of time, the air transportation vehicle 40 is located along the 4DT 12 within the upper route structure 24, and consumes a second unit of SSA capacity 42 having dimensions corresponding with the requirements for that altitude, as noted above. During a third period of time, which is after the second period of time, the air transportation vehicle 50 is located along the 4DT 12 within the upper route structure 24, and consumes a third unit of SSA capacity 52 likewise having dimensions corresponding with the requirements for the upper route structure 24.

Illustrative Market Structure and Operation for
Definition and Commoditization of
Four-Dimensional Air Travel Trajectories With reference to the attached figures, an illustrative market structure for the definition and commoditization of four-dimensional air travel trajectories in accordance with the present invention will be described.

In this embodiment, one or more commodities markets for the competitive purchase of flight bundles, or components thereof, would be established. For example, a commodities market could exist for the competitive purchase of units of RE capacity, and a separate commodities market could exist for the competitive purchase of units of SSA capacity. In the alternative, a single commodities market would exist in which a complete flight bundle, which includes a 4DT and two accompanying units of RE capacity, would be sold, for example the commodities market for flight bundles 60 shown in FIG. 3. Each of these commodities markets would preferably operate similar to other commodities exchange markets, for example the Chicago Board of Trade or the New York Mercantile Exchange. Preferably, the market 60 would operate on an exemplary computing system 100 and/or through an exemplary computer network environment 200, such as those described below and shown in FIGS. 5 and 6. The other parties who interact with the market 60 would preferably do so via the use of a similar exemplary computing system 100 and/or through a similar exemplary computer network environment 200.

Figure 3:
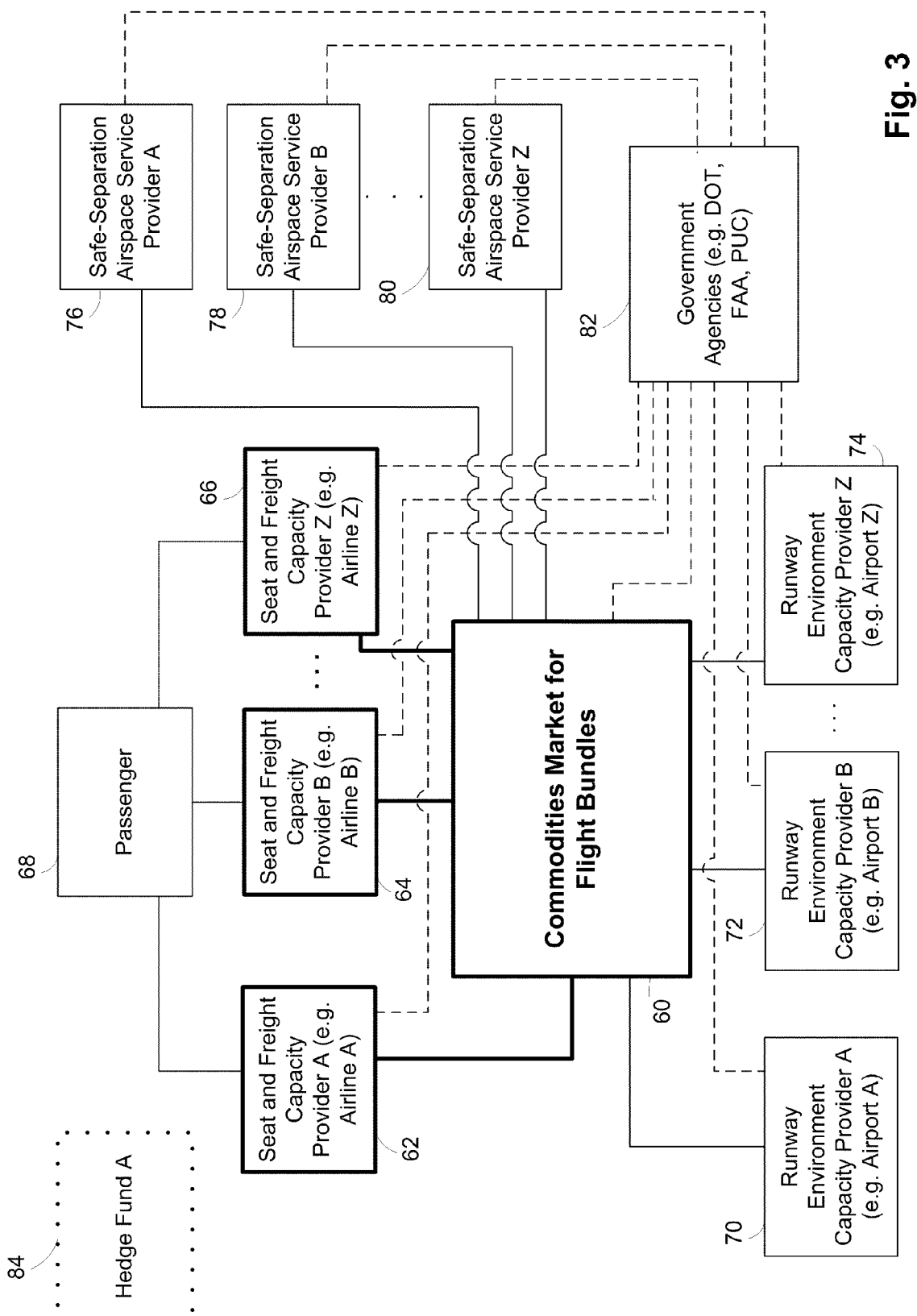
FIG. 3 is a block diagram showing an illustrative embodiment of interaction between a commodities market for flight bundles and exemplary parties.
Figure 8:
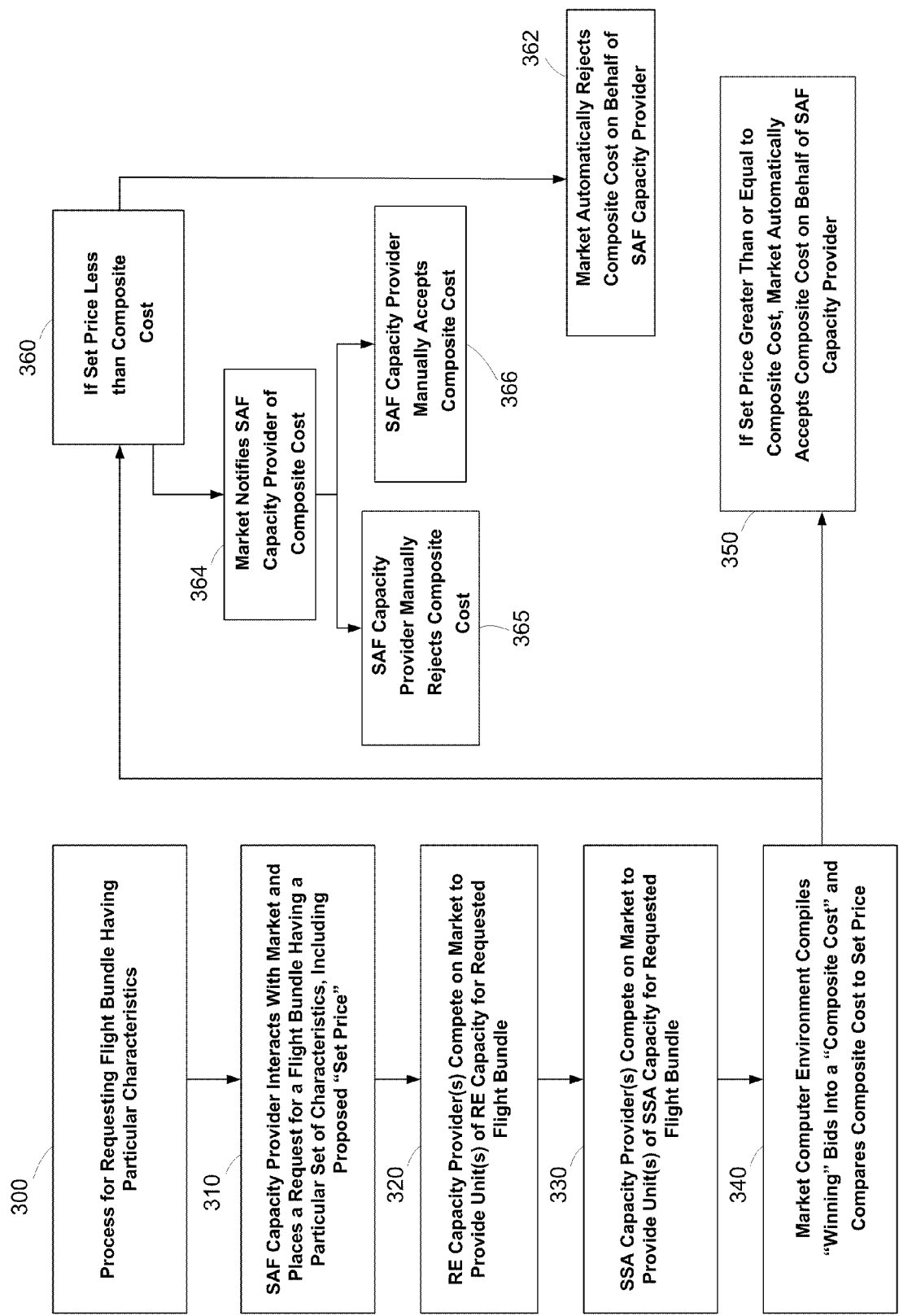
FIG. 8 is a flow chart showing the exemplary steps of a first embodiment of a transaction on the commodities market for flight bundles.

The market 60 could operate in a number of alternative ways. With reference to FIGS. 3 and 8, in a first exemplary commodities market 300, a first SAF capacity provider, for example SAF Capacity Provider A 62, could interact with the market 60 and place a "request" 310 for a complete flight bundle having a particular desired set of characteristics, i.e. departure date/time, departure location, and arrival location, and would offer a "set price" for purchase of that complete flight bundle. One or more applicable RE capacity providers, for example RE Capacity Provider A 70, RE Capacity Provider B 72, and/or RE Capacity Provider Z 74, and one or more SSA service providers, for example SSA Service Provider A 76, SSA Service Provider B 78, and/or SSA Service Provider Z 80, could then interact with the market 60 at steps 320 and 330, discover the flight bundle price requested by SAF Capacity Provider A 62, and competitively bid against another to provide the respective components of the requested flight bundle for the lowest cost. The market 60 would compile the "winning" bids for provision of the components of the flight bundle into a "composite cost" and compare this cost with the set price at step 340. If the set price offered by SAF Capacity Provider A 62 has been met, i.e. the set price is greater or equal to the composite cost, the market 60 may automatically secure the purchase of the flight bundle and communicate same to SAF Capacity Provider A 62 at step 350. If the set price of SAF Capacity Provider A 62 has not been met, i.e. the set price is less than the composite cost, shown at step 360, the market 60 may automatically reject the composite cost on behalf of SAF Capacity Provider A 62 at step 362. In the alternative, the market 60 could notify SAF Capacity Provider A 62 of the composite cost at step 364, and give SAF Capacity Provider A 62 the option of manually rejecting the composite cost at step 365 or manually accepting the composite cost for the flight bundle at step 366.

Figure 9:
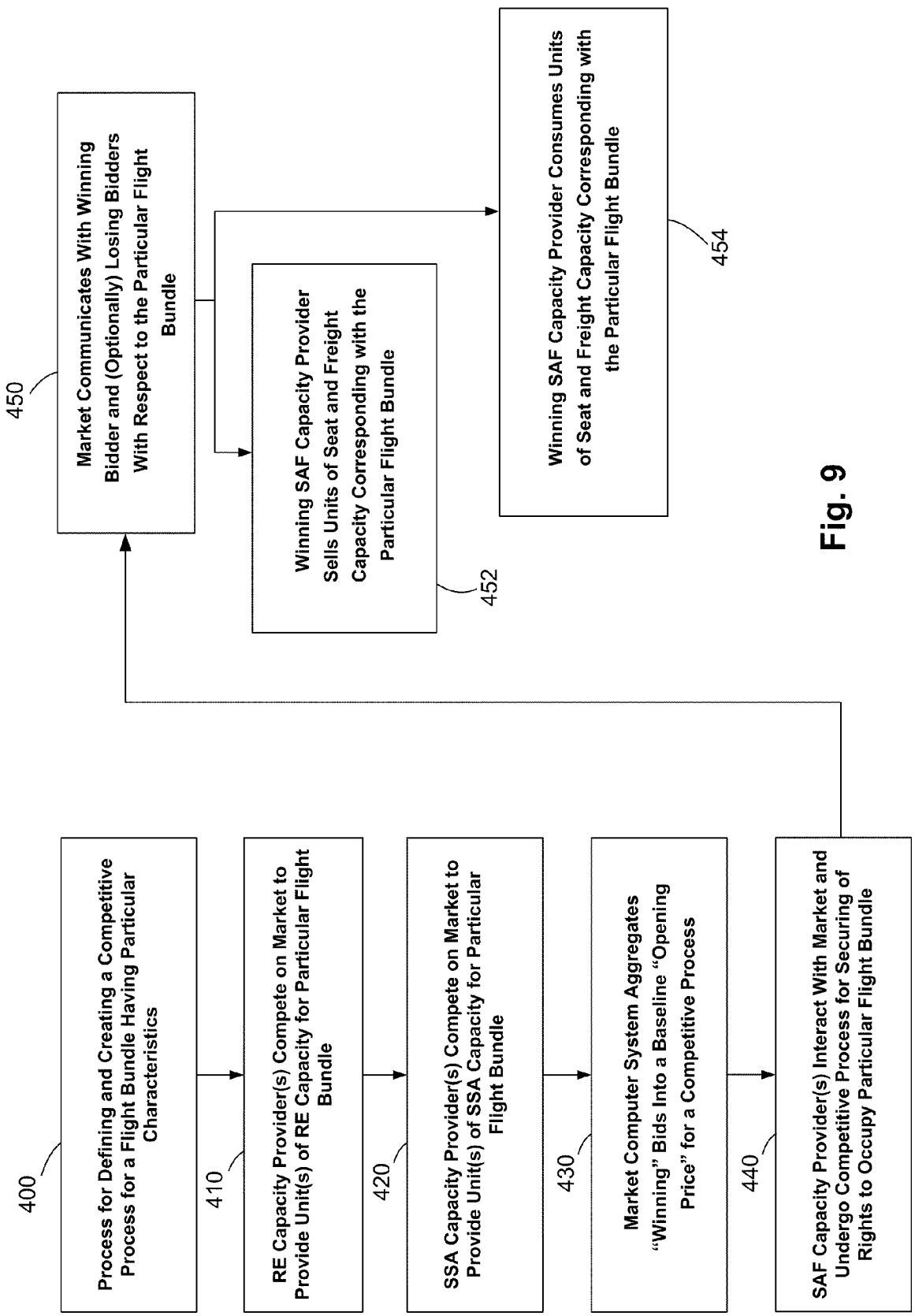
FIG. 9 is a flow chart showing the exemplary steps of a second embodiment of a transaction on the commodities market for flight bundles.

With reference to FIGS. 3 and 9, in a second exemplary commodities market 400, one or more applicable RE capacity providers, for example RE Capacity Provider A 70, RE Capacity Provider B 72, and/or RE Capacity Provider Z 74, and one or more SSA service providers, for example SSA Service Provider A 76, SSA Service Provider B 78, and/or SSA Service Provider Z 80, would interact with the market 60 and offer their respective service(s) for the provision of a unit of RE capacity or one or more units of SSA capacity for a particular flight bundle at steps 410 and 420. Most preferably, SSA providers would compete to offer a complete bundle of SSA units along a particular 4DT between the units of RE capacity. The "winning" bids for provision of the components of the particular flight bundle would be aggregated by the computing system of the market 60 into a baseline "opening price" at step 430. This opening price would then be communicated to one or more SAF capacity providers, for example SAF Capacity Provider A 62, SAF Capacity Provider B 64, and SAF Capacity Provider Z 66, who would interact with the market 60 to compete with one another to purchase said flight bundle at step 440. When the competitive process for the purchase of the flight bundle has ended, the market 60 would communicate with the winning SAF capacity provider, and optionally the losing SAF capacity provider(s), to inform them of the identity of the winning bidder and to supply other details regarding the flight bundle at step 450.

Once the rights to a particular flight bundle have been acquired by a SAF capacity provider, the SAF capacity provider may then optionally sell units of SAF capacity (e.g., seats, freight volume/weight) corresponding with that flight bundle at step 452. The SAF capacity provider may, in the alternative, themselves consume all of the SAF capacity corresponding with that flight bundle at step 454.

The flight bundles available on the market 60 could be optimally defined based on the goals of minimizing fuel consumption, travel duration, and/or air-traffic density constraints. It should be understood that flight bundles containing less than optimal units of RE capacity and/or SSA capacity could also be offered for sale on the market 60, or on one or more separate commodities markets for 4DTs, flight bundles, or complete flight bundles. Further, one or more commodities markets could exist for the sale of individual or bundled units of SSA capacity which comprise less than a complete 4DT.

In the exemplary commodities market 400, both the competitive process to provide RE capacity and/or SSA capacity services and the competitive process to acquire the rights to consume a flight bundle would close on a particular date and time prior to the scheduled departure date/time of the flight bundle. For example, the competitive process to provide RE capacity and/or SSA capacity services for a particular flight bundle could close 18 months prior to the flight bundle departure date, and the competitive process for purchase of that flight bundle could close 16 months prior to the departure date. It should be understood that the competitive process associated with the purchase of a particular flight bundle may close at any point prior to the departure date and time of the flight bundle, for example 12 months, 6 months, 3 months, 1 month, or 2 weeks before the departure date of the flight bundle. As discussed in greater detail below, where one or more contingent units of RE capacity, contingent 4DTs, or portions thereof are included as part of a purchased flight bundle, one or more short-term commodities markets for the trade or re-sale of those contingent units of RE capacity, contingent 4DTs, or portions thereof may exist. Resellers of contingent units of RE capacity, contingent 4DTs, or portions thereof may offer for sale those items on said one or more commodities markets up to and including the date associated with those units.

Figure 4:
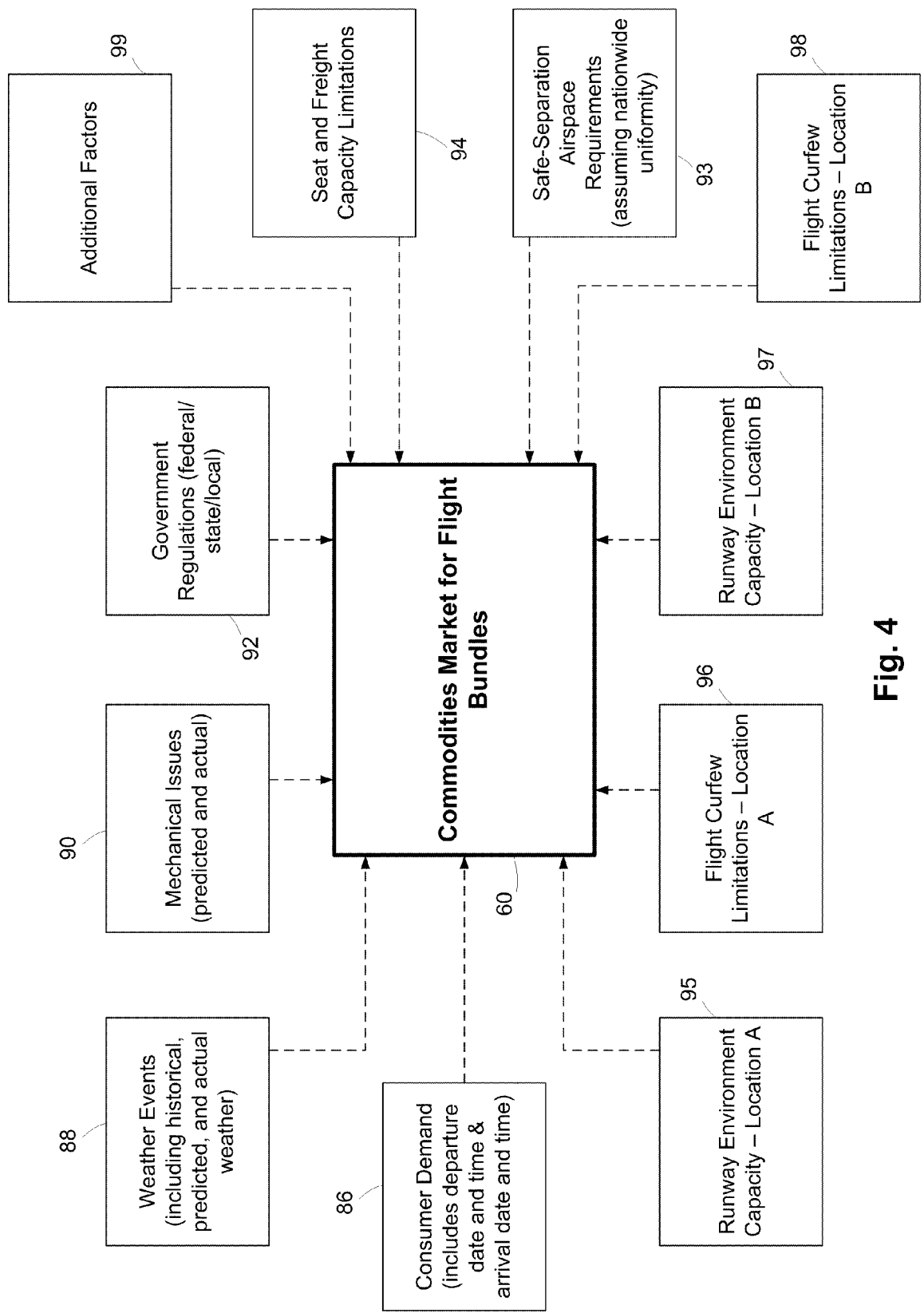
FIG. 4 is a block diagram showing exemplary factors which affect the commodities market for flight bundles in accordance with the herein described systems and methods.

As shown in FIG. 4, a number of factors may affect the price of a particular flight bundle. In addition to consumer demand 86 (which encompasses both the desired departure and arrival dates and times), and the factors stated above which affect supply (e.g., seat and freight capacity limitations 94; runway environment capacity at departure location A 95, runway environment capacity at arrival location B 97, flight curfew limitations at departure location A 96 and arrival location B 98, safe-separation airspace requirements 93, and government regulations 92), variable factors such as weather events 88 (including historical probabilities, short-term predicted data, and actual weather conditions), mechanical issues 90 (including historical probabilities and actual mechanical issues), and a myriad of additional factors 99 may affect the price of a particular flight bundle.

Weather events 88, for example, may prevent the consumption of individual units of RE capacity or SSA capacity, or may prevent the consumption of a complete flight bundle. Probability tables and historical data may be used to calculate the long-term risk that a weather event 88 will prevent the consumption of all or part of a particular flight bundle. Historical data and other factors may be used well in advance to calculate the risk that mechanical issues 90 will prevent the consumption of all or part of a flight bundle. The potential for additional factors 99, such as, for example, labor shortages, to prevent the consumption of all or part of a flight bundle, may also be accounted for in calculating the price of a flight bundle. In order to be prepared for such events, an SAF capacity provider may choose to purchase one or more contingent units of RE capacity, contingent 4DTs, or contingent flight bundles (which may or may not be complete flight bundles) which they would be able to use in the event that a "primary" unit of RE capacity or 4DT, or some component thereof, was rendered somehow unusable. A contingent flight bundle may, for example, be comprised of the same units of RE capacity as the primary flight bundle, but be comprised of different units of SSA capacity (usable, for example, to avoid the path of a storm which is approaching the departure unit of RE capacity along the path of the primary SSA capacity units). As another example, a contingent flight bundle may be comprised of the exact same three-dimensional trajectory as the primary flight bundle, but during a different duration of time. By way of further example, a contingent flight bundle may be comprised of at least one unit of RE capacity which differs from that of the primary flight bundle, but may share in common all or most of the units of SSA capacity with the primary flight bundle.

As stated above, contingent flight bundles may be bought and sold on one or more commodities markets, for example market 60, up to and including the date of departure of the flight bundle. A SAF capacity provider may purchase a flight bundle on the long-term commodities market which includes both a primary 4DT and at least one contingent 4DT. If a contingent 4DT is not needed, for example where actual weather events 88 or mechanical issues 90 do not impair the use of the primary 4DT, the SAF capacity provider may offer the secondary 4DT, or portions thereof, for resale on the commodities market. In the alternative, an SAF capacity provider could purchase a flight bundle on the long-term market which consists only of a single 4DT, and either risk having all or part of that 4DT destroyed without having a replacement therefor, or purchasing a contingent 4DT on a short-term commodities market, if necessary.

Optionally, SAF capacity providers, SSA service providers, and RE capacity providers could hedge some of the risks associated with, for example, weather events 88 destroying all or part of a flight bundle by purchasing commodities whose values would typically be expected to increase under inclement weather conditions. These "hedge commodities" may be purchased, for example, via a hedge fund, for example Hedge Fund A 84 (see FIG. 3). It should be understood that hedging of risk via the purchase of hedge commodities, for example, could occur by any involved party and at any stage of the processes disclosed herein.

In the scenario where a first air transportation vehicle is forced to infringe on the purchased 4DT of a second air transportation vehicle, whether by emergent circumstances or not, thereby forcing the second air transportation vehicle to deviate from their purchased 4DT, there would preferably be a procedure by which the SAF capacity provider operating the first air transportation vehicle would reimburse the SAF capacity provider operating the second air transportation vehicle. The second SAF capacity provider could then pass some of these reimbursement funds on to, for example, their passengers.

Full implementation of the systems and methods in accordance with the present invention throughout the entire U.S. air transportation industry would likely take several years. Accordingly, it is expected that initial implementation of the herein disclosed systems and methods will occur along light-travelled three-dimensional trajectories between non-hub, low-demand airports.

EXAMPLES ACCORDING TO THE PRESENT INVENTION

Example #1

In a first illustrative example, for a particular complete flight bundle, the desired departure date, time, and location are predetermined characteristics, as are the desired arrival date, time, and location. For purposes of this example, the desired characteristics of the complete flight bundle are: a desired departure and arrival date of Thursday, Nov. 26, 2010 (Thanksgiving Day in the United States), a desired departure time of 9:00 a.m. EST, a desired departure location of New York City's John F. Kennedy International Airport, a desired arrival time of 11:15 a.m. EST, and a desired arrival location of Chicago O'Hare International Airport.

In this example, only one RE capacity provider, i.e. JFK International Airport, is capable of providing the desired unit of RE capacity on the departure end of the desired flight bundle. Likewise, only one RE capacity provider, i.e. O'Hare International Airport, is capable of providing the desired unit of RE capacity on the arrival end of the desired flight bundle. In this example, these two RE capacity providers (or parties acting on there behalf) would interact with the market 60, for example through an exemplary computing system 100 and/or communications network 160, by providing cost information for the provision of a RE capacity unit at the desired date and time. The market 60 could store this cost information, for example in the read-only memory ("ROM") 130 of its computing system 100, for eventual combination with the other components which make up the baseline cost for the flight bundle, or for access by the other parties who interact with the market 60. In this embodiment, the deadline for RE capacity providers to provide cost information to the market 60 for the provision of RE capacity units is set at, for example, 18 months prior to the departure date of the flight bundle, i.e. May 26, 2009.

As shown in FIG. 3, one or more SSA service providers, for example SSA Service Provider A 76, SSA Service Provider B 78, and/or SSA Service Provider Z 80, could compete on the market 60 to provide SSA services, for the lowest price, between the two units of RE capacity (i.e. those associated with JFK and O'Hare, respectively) for the particular flight bundle detailed above. In the alternative, one or more SSA service providers could compete to provide SSA services for particular units of SSA capacity along the desired 4DT. When the auction or other competitive process has concluded for provision of either SSA services between the two units of RE capacity or for units of SSA capacity along the 4DT, the computing system 100 associated with the market 60, for example via a computing application 180 and/or via the communications network 160, may communicate with the bidding SSA service provider(s) and inform them whether or not they offered the winning bid to provide SSA services for a particular 4DT or unit(s) of SSA capacity along that 4DT. In this embodiment, the winning SSA service provider(s) would then store data relating to the particular SSA services they have agreed to provide, for example in the ROM 130 of their own computing system 100. In this embodiment, the deadline for SSA service providers to provide cost information to the market 60 for the provision of units of SSA capacity may be set at, for example, 14 months prior to the departure date of the 4DT, i.e. Sep. 26, 2009.

In this example, once the winning bids have been entered for provision of RE capacity and SSA capacity for the particular flight bundle, the flight bundle may be offered on the market 60 to one or more SAF capacity providers. As illustrated in FIG. 3, one or more SAF capacity providers, for example SAF Capacity Provider A 62, SAF Capacity Provider B 64, and SAF Capacity Provider Z 66 may compete on the market 60 to obtain rights to the particular flight bundle having the above characteristics. The participating SAF capacity providers would interact with the market 60, for example through an exemplary computing system 100 and/or communications network 160, by offering bids for the rights to consume the particular flight bundle. As detailed above, the market 60 may operate in a fashion by which the auction or other competitive process for purchase of the above-detailed flight bundle ends on a predetermined date, for example, 12 months, 6 months, 3 months, 1 month, or 2 weeks prior to the departure date of the flight bundle.

Optionally, once the winning bid has been entered for the right to occupy the particular flight bundle, the winning SAF capacity provider may then offer tickets for sale to passengers, for example Passenger 68 (see FIG. 3) in order to fill units of SAF capacity on the particular air transportation vehicle which will occupy the flight bundle. As stated above, it should be understood that the SAF capacity provider may also be the end-user of the flight bundle, for example where the flight bundle will be used for transportation of non-passenger freight, cargo, or the like.

Example #2

In a second illustrative example, the desired characteristics of the flight bundle are: a departure and arrival date of Thursday, Nov. 26, 2010, a departure time of 9:00 a.m. EST, a departure location of the extended New York City market, an arrival time of 11:15 a.m. EST, and an arrival location of the extended Chicago market.

In this example, there is some flexibility in the characteristic of the desired RE capacity provider, both on the departure and arrival ends of the flight bundle. In this example, more than one RE capacity provider, for example JFK International Airport, LaGuardia Airport, and Newark Liberty International Airport, is capable of providing the desired unit of RE capacity on the departure end of the desired flight bundle. Likewise, more than one RE capacity provider, for example O'Hare International Airport and Chicago Midway International Airport, is capable of providing the desired unit of RE capacity on the arrival end of the desired flight bundle. In this example, the relevant RE capacity providers (or parties acting on there behalf) would interact with the market 60, for example through an exemplary computing system 100 and/or communications network 160, by providing their respective bid amounts for provision of a RE capacity unit at the desired date and time. When the auction or other competitive process has concluded for provision of each of the units of RE capacity within the flight bundle, the computing system 100 associated with the commodities market 60, for example via a computing application 180 and/or via the communications network 160, may communicate with each bidding RE capacity provider and inform them whether or not they offered the winning bid for the provision of a unit of RE capacity for the desired flight bundle. The market 60 could store information relating to the winning bid, for example in the read-only memory ("ROM") 130 of its computing system 100, for eventual combination with the other components which make up the baseline cost for the flight bundle, or for access by the other parties who interact with the market 60. In this embodiment, the deadline for RE capacity providers to provide cost information to the market 60 for the provision of RE capacity units is set at, for example, 12 months prior to the departure date of the flight bundle, i.e. Nov. 26, 2009.

One or more SSA service providers could then compete on the market 60 to provide SSA services between the two chosen units of RE capacity along the flight bundle, as substantially described above with respect to Example #1. Likewise, once the winning bids have been entered for provision of RE capacity and SSA capacity for the particular flight bundle, the flight bundle may be offered on the market 60 to one or more SAF capacity providers, as substantially described above with respect to Example #1.

Example #3

In a third illustrative example, the desired characteristics of the flight bundle are: a departure and arrival date of Thursday, Nov. 26, 2010, a flexible departure and arrival time, a departure location of the extended New York City market, and an arrival location of the extended Chicago market.

In this example, there is greater flexibility in the requisite availability time for provision of units of RE capacity and SSA capacity. The relevant RE capacity providers, for example JFK International Airport, LaGuardia Airport, and Newark Liberty International Airport on the departure end of the flight bundle, may compete on the market 60 to provide the lowest cost units of RE capacity for a flight bundle meeting the above desired characteristics. The RE capacity providers on the arrival end of the flight bundle may compete on the market 60 in a like fashion. These parties would compete on the market 60 as substantially described above with respect to Examples #1 and #2.

One or more SSA service providers could then compete on the market 60 to provide SSA services between the two chosen units of RE capacity along the flight bundle, as substantially described above with respect to Examples #1 and #2. Likewise, once the winning bids have been entered for provision of RE capacity and SSA capacity for the particular flight bundle, the flight bundle may be offered on the market 60 to one or more SAF capacity providers, as substantially described above with respect to Examples #1 and #2.

Example #4

In a fourth illustrative example, the desired characteristics of the flight bundle are: a desired departure and arrival date of Thursday, Nov. 26, 2010, a desired departure time of 9:00 a.m. EST, a desired departure location of New York City's John F. Kennedy International Airport, a desired arrival time of 11:15 a.m. EST, and a desired arrival location of Chicago O'Hare International Airport.

The relevant parties would interact with the market 60 in substantially the same fashion as detailed in Example #1, above. In this example, however, the bidding SAF capacity providers are interested in purchasing a contingent 4DT to be prepared in case weather events 88, mechanical issues 90, or additional factors 99 destroy all or part of the primary 4DT. This could be accomplished in at least two ways. For example, one or more of the bidding SAF capacity providers could interact with the market 60 prior to the start of the competitive process and let it be known that they desire to purchase a flight bundle comprising a complete, "primary" 4DT and all or part of a contingent, "secondary" 4DT having a certain set of characteristics. The interested SSA capacity providers would then compete on the market 60 to provide a flight bundle comprising these elements in the same fashion as substantially described above with respect to Example #1. In the alternative, the one or more SAF capacity providers could compete on the market 60 to purchase a flight bundle which consists of only a primary 4DT. The winning SAF capacity provider could then compete to purchase one or more contingent 4DTs, or portions thereof, in a second competitive process on the market 60 or a separate commodities market. This second competitive process could be a short-term auction occurring weeks, days, or even on the same day as the departure date of the primary flight bundle.

In this example, the SAF capacity provider that has purchased the primary and secondary 4DTs is SAF Capacity Provider A 62. In this example, short-term predicted, in addition to actual weather events 88 act to destroy a portion of the primary 4DT. As a result, SAF Capacity Provider A 62 may choose to consume the secondary 4DT that was purchased on the market 60 as part of their flight bundle (or which was purchased in the second competitive process). SAF Capacity Provider A 62 may then resell the undestroyed portions of the primary 4DT on the market 60 or another commodities market.

Optionally, once the winning SAF capacity provider has secured the desired flight bundle(s), they may then offer tickets for sale to passengers in order to fill units of SAF capacity on the particular air transportation vehicle which will occupy either the primary or the secondary 4DT. As stated above, it should be understood that the SAF capacity provider may also be the end-user of the 4DT, for example where the 4DT will be used for transportation of non-passenger freight, cargo, or the like.

Example #5

In a fifth illustrative example, the desired characteristics of the flight bundle are: a departure and arrival date of Thursday, Nov. 26, 2010, a departure time of 9:00 a.m. EST, a departure location of the extended New York City market, an arrival time of 11:15 a.m. EST, and an arrival location of the extended Chicago market.

In this example, as in Example #2, above, there is some flexibility in the characteristic of the desired RE capacity provider, both on the departure end and the arrival end of the flight bundle. Therefore, as substantially described above with respect to Example #2, multiple RE capacity providers would compete on the market 60 for the right to offer the desired unit of RE capacity on the arrival or departure end of the desired flight bundle. The interested SSA capacity providers would also compete on the market 60 to provide their respective services, as substantially described above with respect to Example #2.

As in the previous example, the bidding SAF capacity providers are interested in purchasing a contingent 4DT in case weather events 88, mechanical issues 90, or additional factors 99 destroy all or part of the primary 4DT. These parties would interact with the market 60 and/or other commodities markets to secure one or more contingent 4DTs, as substantially described with respect to Example #4, above.

In this example, the SAF capacity provider that has purchased the primary and secondary 4DTs is SAF Capacity Provider A 62. In this example, short-term predicted, in addition to actual, weather events 88 do not intervene to destroy any portion of the primary 4DT. As a result, SAF Capacity Provider A 62 may choose to consume the primary 4DT. SAF Capacity Provider A 62 may then resell all or portions of the secondary 4DT on the market 60 or another commodities market.

Example #6

In a sixth illustrative example, the desired characteristics of the flight bundle are: a departure and arrival date of Thursday, Nov. 26, 2010, a flexible departure and arrival time, a departure location of the extended New York City market, and an arrival location of the extended Chicago market.

In this example, as in Example #3, above, there is greater flexibility in the requisite availability time for provision of units of RE capacity and SSA capacity. The relevant RE capacity providers, as described in Example #3, may compete on the market 60 as substantially described in the above examples, to provide the lowest cost units of RE capacity, on both the departure and arrival end, for a flight bundle meeting the above desired characteristics. One or more SSA service providers would also compete on the market 60 to provide SSA services between the two chosen units of RE capacity within the flight bundle, as substantially described in the above examples.

As is the case in Examples #4 and #5, above, the bidding SAF capacity providers are interested in purchasing a contingent 4DT to be prepared in case weather events 88, mechanical issues 90, or additional factors 99 destroy all or part of the primary 4DT. These parties would interact with the market 60 and/or other commodities markets to secure one or more contingent 4DTs, as substantially described with respect to Examples #4 and #5, above.

In this example, the SAF capacity provider that has purchased the primary and secondary 4DTs is SAF Capacity Provider A 62. In this example, as in Example #5, short-term predicted, in addition to actual, weather events 88 do not intervene to destroy any portion of the primary 4DT prior to departure of the air transportation vehicle. As a result, SAF Capacity Provider A 62 resells their contingent 4DT on the market 60 or another commodities market prior to departure. During the flight, however, a second air transportation vehicle experiences an emergency situation and must deviate from their purchased 4DT into one or more units of RE capacity or SSA capacity which comprise SAF Capacity Provider A 62's purchased 4DT. SAF Capacity Provider A 62's air transportation vehicle may then be compelled to make a spot purchase on the market 60 or another commodities market of one or more suitable replacement units of RE capacity or SSA capacity. It may also be possible for SAF Capacity Provider A 62 to re-buy some or all of the units of SSA capacity which were part of the previously held contingent 4DT. Following this transaction, there would be a reimbursement event, either through the market 60, a separate commodities market, or some private transaction, by which the operator of the second air transportation vehicle would reimburse SAF Capacity Provider A 62 for the cost of purchase of said replacement units of RE capacity or SSA capacity and, optionally, pay a surcharge for consumption of component(s) of SAF Capacity Provider A 62's primary 4DT.

Illustrative Computing System

For purposes of the herein described systems and methods, it should be understood that an exemplary computing system 100 may be utilized by the parties who are interacting with the commodities market for flight bundles 60 and/or by the operators of the computing system which houses the commodities market for flight bundles 60.

Figure 5:
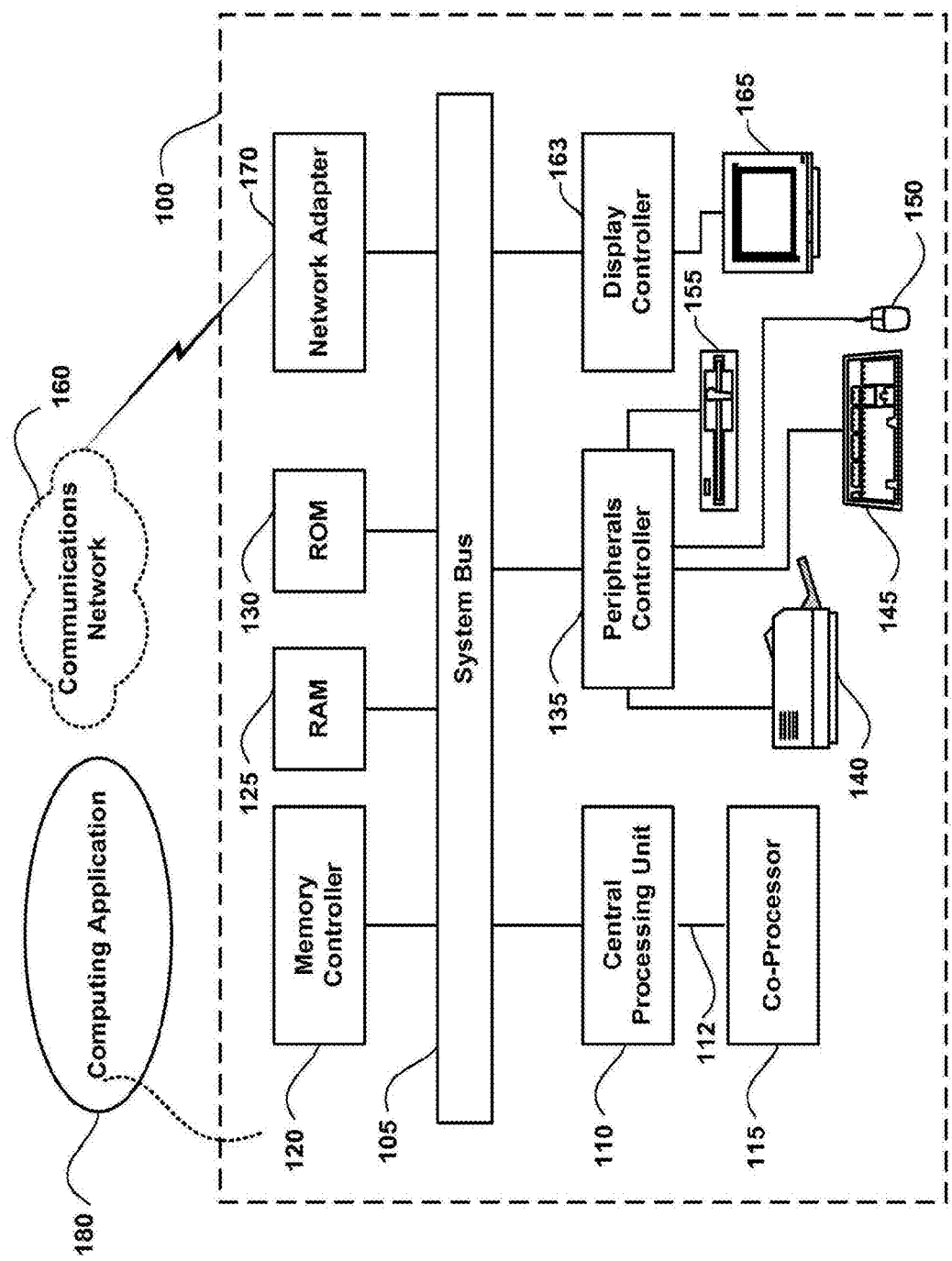
FIG. 5 is a block diagram of an exemplary computing environment in accordance with an implementation of the herein described systems and methods.

FIG. 5 depicts an exemplary computing system 100 in accordance with herein described system and methods. The computing system 100 is capable of executing a variety of computing applications 180. Computing applications 180 may comprise a computing application, a computing applet, a computing program, and other instruction sets operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to perform a function. In many known computer servers, workstations, and personal computers, CPU 110 is implemented by micro-electronic chips called microprocessors. A coprocessor 115 is an optional processor, distinct from the main CPU 110, that performs additional functions or assists the CPU 110. The CPU 110 may be connected to the coprocessor 115 through interconnect 112. One common type of coprocessor is the floating-point coprocessor, also called a numeric or math coprocessor, which is designed to perform numeric calculations faster and better than the general-purpose CPU 110.

In operation, the CPU 110 fetches, decodes, and executes instructions, and transfers information to and from other resources via the computer's main data-transfer path, system bus 105. The system bus 105 connects the components in the computing system 100 and defines the medium for data exchange. Memory devices coupled to the system bus 105 include random access memory (RAM) 125 and read only memory (ROM) 130. Such memory devices include circuitry that allows information to be stored and retrieved. The ROMs 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed.

In addition, the computing system 100 can contain a peripherals controller 135, which is responsible for communicating instructions from the CPU 110 to peripherals, such as, printer 140, keyboard 145, mouse 150, and data storage drive 155. Display 165, which is controlled by a display controller 163, is used to display visual output generated by the computing system 100. Such visual output may include text, graphics, animated graphics, and video. The display controller 163 includes electronic components required to generate a video signal that is sent to display 165. Further, the computing system 100 can contain network adaptor 170 which may be used to connect the computing system 100 to an external communication network 160.

Illustrative Computer Network Environment

Figure 6:
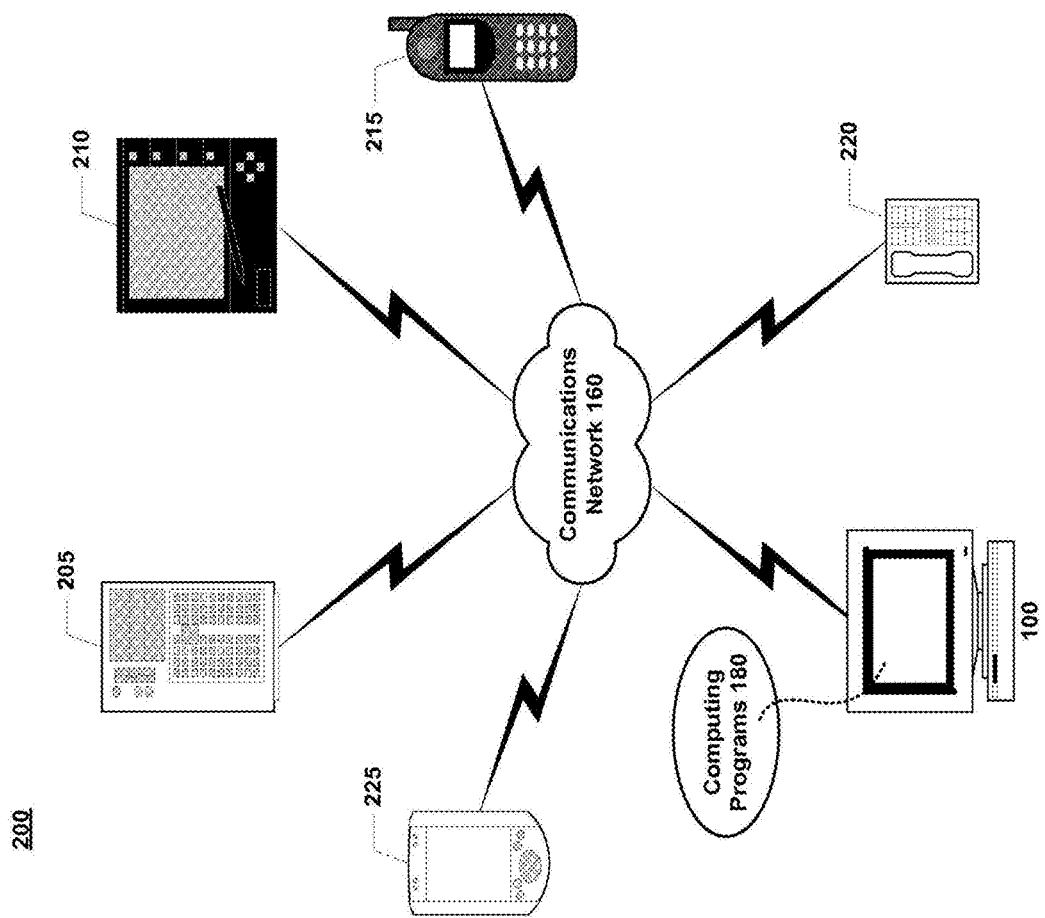
FIG. 6 is a block diagram showing the cooperation of exemplary components of an illustrative implementation in a networked computing environment in accordance with the herein described systems and methods.

Computing system 100, described above, can be deployed as part of a computer network. In general, the above description for computing environments applies to both server computers and client computers deployed in a network environment. FIG. 6 illustrates an exemplary, illustrative networked computing environment 200, with a server in communication with client computers via a communications network, in which the herein described apparatus and methods may be employed. As shown in FIG. 6, server 205 may be interconnected via a communications network 160 (which may be either of, or a combination of, a fixed-wire or wireless LAN, WAN, intranet, extranet, peer-to-peer network, virtual private network, the internet, or other communications network) with a number of client computing environments such as tablet personal computer 210, mobile telephone 215, telephone 220, computing system 100 (e.g., a personal computer), and personal digital assistant (PDA) 225. In a network environment in which the communications network 160 is the internet, for example, server 205 can be dedicated computing-environment servers operable to process and communicate data to and from client computing environments 100, 210, 215, 220, and/or 225 via any of a number of known protocols, for example hypertext transfer protocol (HTTP), file transfer protocol (FTP), simple object access protocol (SOAP), or wireless application protocol (WAP). Additionally, networked computing environment 200 can utilize various data security protocols such as secure sockets layer (SSL), transport layer security (TSL), or pretty good privacy (PGP). Each client computing environment 100, 210, 215, 220, and 225 can be equipped with an operating system operable to support one or more computing applications, such as a web browser (not shown) or other graphical user interface (not shown), or a mobile desktop environment (not shown) to gain access to server computing environment 205.

In operation, a user (not shown) may interact with a computing application running on a client computing environment to obtain desired data and/or computing applications. The data and/or computing applications may be stored on server computing environment 205 and communicated to participating users through client computing environments 100, 210, 215, 220, and 225, over exemplary communications network 160. A participating user may request access to specific data and applications housed in whole or in part on server computing environment 205. This data may be communicated between client computing environments 100, 210, 215, 220, and 220 and server computing environments for processing and storage. Server computing environment 205 may host computing applications, processes, and applets for the generation, authentication, encryption, and communication of data and applications and may cooperate with other server computing environments (not shown), third party service providers (not shown), network attached storage (NAS), and storage-area networks (SAN) to realize application/data transactions.

Interaction With the Commodities Market for Flight Bundles

Figure 7:
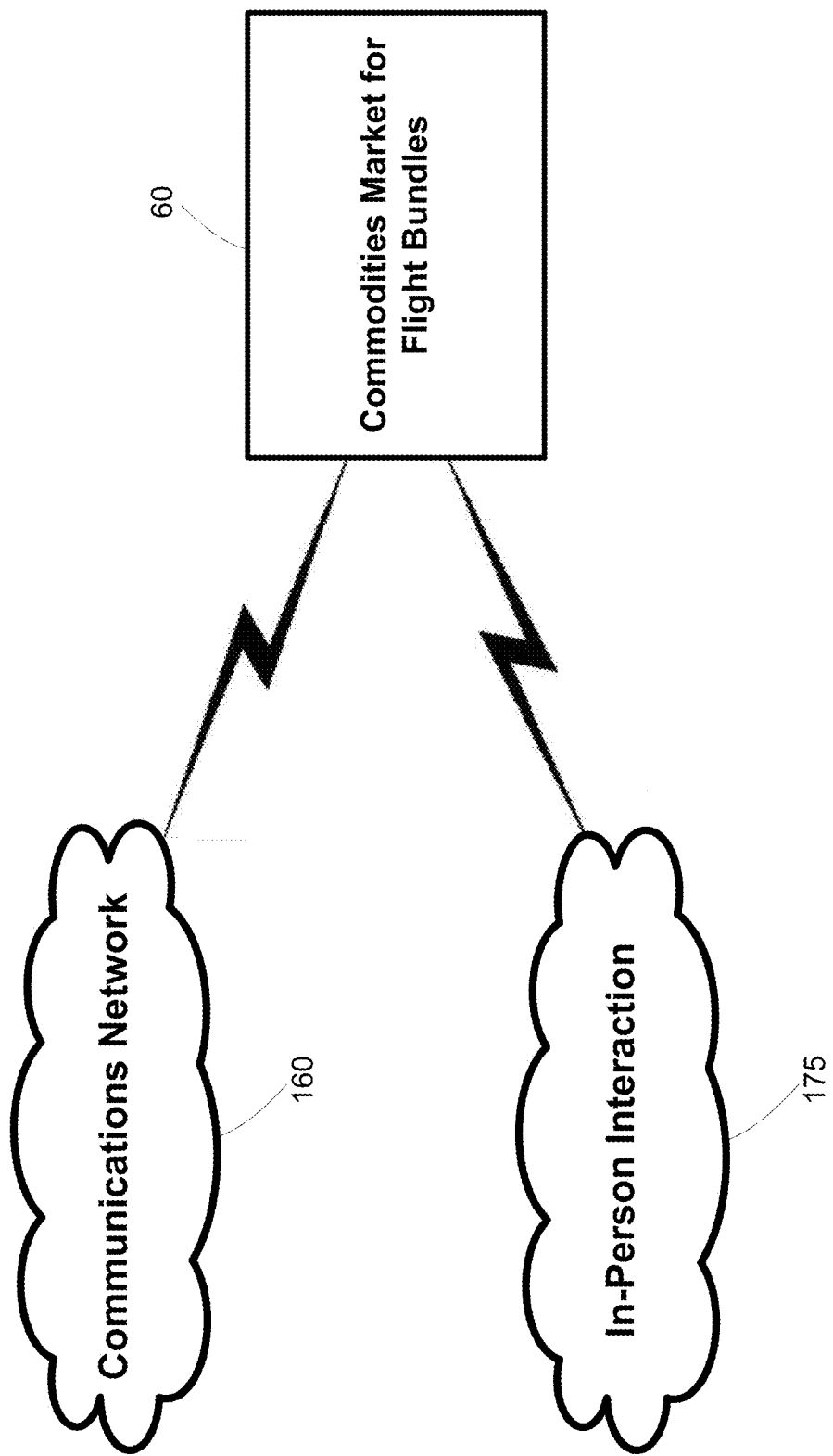
FIG. 7 is a block diagram showing exemplary methods for interacting with an illustrative implementation of a commodities market for flight bundles.

FIG. 7 shows exemplary interaction methods with an illustrative implementation of a commodities market for flight bundles 60. Preferably, parties can interact with the market 60 via the exemplary communications network 160. Communication, processing, and storage of data—on both sides of the interaction—may be accomplished via an exemplary computing system 100. In the alternative, interaction between parties and the market 60 may be accomplished through "in-person" interaction 175, such as for example on a trading floor.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A method for managing air transportation, comprising:
defining a flight bundle, the flight bundle comprising a first four-dimensional air travel trajectory, the first four-dimensional air travel trajectory including a plurality of spatially contiguous units of volumetric airspace at temporally contiguous points in time, wherein the plurality of spatially contiguous units of volumetric airspace are located exterior to an airport traffic area; and
granting rights, via a first market-based process performed using a first computing environment, for an air transportation vehicle to consume the flight bundle.

2. The method of claim 1, wherein the flight bundle further comprises a second four-dimensional air travel trajectory, the second four-dimensional air travel trajectory including a plurality of spatially contiguous units of volumetric airspace at temporally contiguous points in time, wherein the plurality of spatially contiguous units of volumetric airspace that comprise the second four-dimensional air travel trajectory are located exterior to an airport traffic area.

3. The method of claim 1, wherein the flight bundle comprises a first unit of runway environment capacity and a second unit of runway environment capacity.

4. The method of claim 3, wherein the first unit of runway environment capacity and the second unit of runway environment capacity are temporally and spatially contiguous with the first four-dimensional air travel trajectory.

5. The method of claim 4, wherein the first unit of runway environment capacity and the second unit of runway environment capacity at least partially occupy the same three-dimensional space.

6. The method of claim 4, wherein the first unit of runway environment capacity and the second unit of runway environment capacity do not occupy any of the same three-dimensional space.

7. The method of claim 2, wherein the flight bundle further comprises a third unit of runway environment capacity and a fourth unit of runway environment capacity.

8. The method of claim 7, wherein the third unit of runway environment capacity and the fourth unit of runway environment capacity are temporally and spatially contiguous with the second four-dimensional trajectory.

9. The method of claim 8, wherein the third unit of runway environment capacity and the fourth unit of runway environment capacity at least partially occupy the same three-dimensional space.

10. The method of claim 8, wherein the third unit of runway environment capacity and the fourth unit of runway environment capacity do not occupy any of the same three-dimensional space.

11. The method of claim 1, wherein the plurality of spatially contiguous units of volumetric airspace extend continuously in space between a first point in space located on an edge of a first airport traffic area and a second point in space located on an edge of a second airport traffic area.

12. The method of claim 2, wherein the second four-dimensional air travel trajectory includes at least some temporal overlap with the first four-dimensional air travel trajectory.

13. The method of claim 1, further comprising permitting one or more parties to compete via a second market-based process performed using the first computing environment or a second computing environment to offer safe-separation airspace services for all or part of the first four-dimensional air travel trajectory.

14. The method of claim 3, further comprising permitting one or more parties to compete via a second market-based process performed using the first computing environment or a second computing environment to offer the first unit of runway environment capacity or the second unit of runway environment capacity.

15. The method of claim 1, further comprising providing a hedge against events that would prevent consumption of the flight bundle.

16. A method for managing air transportation, comprising:
defining a four-dimensional trajectory, wherein the four-dimensional trajectory comprises a plurality of spatially contiguous units of volumetric airspace at temporally contiguous points in time, wherein the plurality of spatially contiguous units of volumetric airspace are not all or part of a unit of runway environment capacity; and
granting rights, via a first market-based process performed using a computing environment, for an air transportation vehicle to consume the four-dimensional trajectory.

17. The method of claim 16, wherein the four-dimensional trajectory comprises a portion of a flight bundle, the flight bundle further comprising a first unit of runway environment capacity and a second unit of runway environment capacity that are temporally and spatially contiguous with the four-dimensional trajectory.

18. The method of claim 16, wherein the plurality of spatially contiguous units of volumetric airspace extend continuously in space between a first point in space located on an edge of a first airport traffic area and a second point in space located on an edge of a second airport traffic area.

19. A computer-implemented interactive method for managing air transportation, comprising:
- defining a flight bundle, the flight bundle comprising a four-dimensional trajectory, the four-dimensional trajectory comprising a plurality of spatially contiguous units of volumetric airspace at temporally contiguous points in time, wherein each of the plurality of spatially contiguous units of volumetric airspace is located between a first point in space on an edge of a first airport traffic area and a second point in space on an edge of a second airport traffic area wherein safe separation airspace capacity services for consumption of the flight bundle are not provided by the Federal Aviation Administration; and
- granting rights, via a first market-based process performed using a computing environment, for an air transportation vehicle to consume the flight bundle.

20. The method of claim 19, wherein the flight bundle further comprises a first unit of runway environment capacity corresponding with the first airport traffic area and a second unit of runway environment capacity corresponding with the second airport traffic area.

* * * * *